W. BENDTZ.
KEY RING.
APPLICATION FILED APR. 26, 1912.
1,070,101. Patented Aug. 12, 1913.
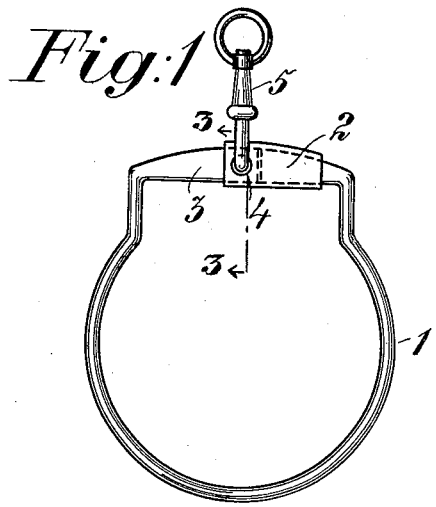
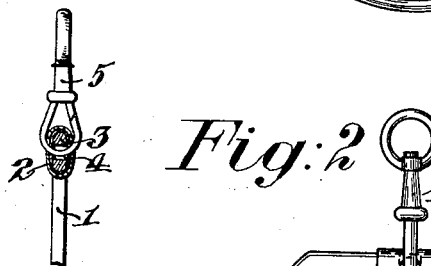
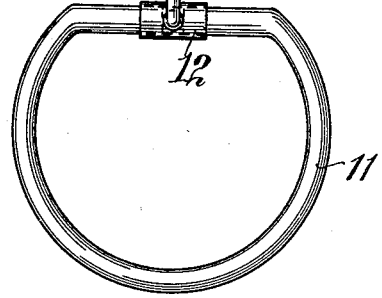
WITNESSES:
John Murtagh
L. M. Dorman
INVENTOR
Wilhelm Bendtz
BY
ATTORNEYS

UNITED STATES PATENT OFFICE.

WILHELM BENDTZ, OF MALMÖ, SWEDEN.

KEY-RING.

1,070,101.   Specification of Letters Patent.   Patented Aug. 12, 1913.

Application filed April 26, 1912. Serial No. 693,396.

*To all whom it may concern:*

Be it known that I, WILHELM BENDTZ, a subject of the King of Sweden, residing at Malmö, Sweden, have invented new and useful Improvements in Key-Rings, of which the following is a specification.

This invention relates to improvements in key rings of the kind in which the ends of the ring are formed with holes for the insertion of a hook or the like for locking purposes.

The invention resides in the improved method of attachment of the ends of the ring.

In the accompanying drawing, Figure 1 is an elevation of a ring embodying the invention, and provided with a sleeve receiving the hook, Fig. 2 is an elevation of another form of ring also provided with a sleeve, and Fig. 3 is a vertical section through the upper part of the ring shown in Fig. 1, on the center line of the hook, being the line 3—3 of Fig. 1.

Similar numerals of reference indicate corresponding parts in the figures.

The ring shown in Fig. 1 consists of a bent resilient metal wire 1 or the like, the one end of which is formed as or is provided with a sleeve 2 embracing the other end 3 of the wire which latter end is conveniently somewhat flattened in the plane of the ring. The sleeve as well as the flattened end of the ring is provided with a hole 4 intended to engage with a spring hook 5, a ring or the like in one end of the chain. The hook thus serves both to keep together the ends of the ring and to fasten the key bunch to the clothes in the usual manner. When the keys are to be taken off or put on the ring, the spring hook is removed from the holes whereafter the ends of the ring can be pulled apart.

In the ring shown in Fig. 2 the sleeve is not firmly connected with one of the ends of the ring, but is arranged to be slidable over them. In this case the ring 11 is not so resilient that the ends can be pulled out of the sleeve 12 when they are both inserted in the same and the hook 15 is thrust into a hole in the middle of the sleeve. When the ring is to be opened, the hook must be removed, whereafter the sleeve is displaced by sliding it wholly over upon one of the ends of the ring, so that the space between the ends is left free for inserting the keys into or removing them from the ring.

What I claim is:

A key-ring, comprising a ring open at one point and provided with a transverse opening, a sleeve arranged to extend over the adjacent ends of the ring, said sleeve being provided with transverse holes registering with the opening of the ring, and a spring-hook adapted to engage the holes of the sleeve and passed through the opening of the ring.

In testimony whereof I have signed my name to this specification in the presence of two subscribing witnesses.

WILH. BENDTZ.

Witnesses:
 EDVIN BJÖRKLUND,
 F. LARSON.

---

Copies of this patent may be obtained for five cents each, by addressing the "Commissioner of Patents,
Washington, D. C."